(12) United States Patent
Stolle et al.

(10) Patent No.: US 11,738,620 B2
(45) Date of Patent: Aug. 29, 2023

(54) MOTOR VEHICLE CHASSIS

(71) Applicant: HOERBIGER AUTOMOTIVE KOMFORTSYSTEME GMBH, Schongau (DE)

(72) Inventors: Klaus Stolle, Altenstadt (DE); Martin Storz, Schwabsoien (DE); Thomas Glas, Kaufbeuren (DE)

(73) Assignee: HOERBIGER AUTOMOTIVE KOMFORSYSTEME GMBH, Schongau (DE)

( * ) Notice: Subject to any disclaimer, the term of this patent is extended or adjusted under 35 U.S.C. 154(b) by 0 days.

(21) Appl. No.: 17/575,280

(22) Filed: Jan. 13, 2022

(65) Prior Publication Data
US 2023/0219392 A1    Jul. 13, 2023

(51) Int. Cl.
*B60G 17/08*    (2006.01)
*B60G 17/015*    (2006.01)

(52) U.S. Cl.
CPC ......... *B60G 17/08* (2013.01); *B60G 17/0155* (2013.01); *B60G 2200/10* (2013.01); *B60G 2401/10* (2013.01); *B60G 2500/206* (2013.01)

(58) Field of Classification Search
CPC ......... B60G 2500/30; B60G 2500/302; B60G 17/08; B60G 17/0155; B60G 2200/10; B60G 2401/10; B60G 2500/206
See application file for complete search history.

(56) References Cited

U.S. PATENT DOCUMENTS

| | | | | |
|---|---|---|---|---|
| 2,926,023 A * | 2/1960 | Kraus | ............. | B60G 21/06 280/124.159 |
| 3,083,983 A * | 4/1963 | Wettstein | ............. | B60G 17/033 280/6.16 |
| 4,973,080 A * | 11/1990 | Ikemoto | ............. | B60G 17/017 280/124.159 |
| 5,724,878 A * | 3/1998 | Stolle | ............. | B60J 7/1273 60/329 |
| 6,010,139 A * | 1/2000 | Heyring | ............. | B60G 21/06 280/124.159 |
| 6,017,023 A * | 1/2000 | Greuter | ............. | B60G 21/06 267/64.11 |

(Continued)

FOREIGN PATENT DOCUMENTS

| | | |
|---|---|---|
| DE | 3223 195 A1 | 12/1983 |
| DE | 197 44 757 A1 | 4/1999 |

(Continued)

*Primary Examiner* — Paul N Dickson
*Assistant Examiner* — Timothy Wilhelm
(74) *Attorney, Agent, or Firm* — MYERS WOLIN, LLC

(57) ABSTRACT

A motor vehicle chassis is provided having a base structure that can be hydraulically adjusted in level between a raised and a lowered position. A hydraulic adjuster is assigned to one of the two foot points of the corresponding suspension spring in each of the four wheel suspensions. At least two of the adjusters can be pressurized in parallel by a common hydraulic aggregate comprising a tank and a motor-pump unit and activated by a control unit. The at least two hydraulic adjusters that can be pressurized by the common hydraulic aggregate communicate hydraulically with the accumulator chamber of a spring-piston accumulator, which has at least one piston-position transmitter linked by signal transmission to the control unit.

9 Claims, 3 Drawing Sheets

(56) References Cited

U.S. PATENT DOCUMENTS

| | | | | |
|---|---|---|---|---|
| 6,036,199 | A * | 3/2000 | Oshida | B60G 17/016 280/5.52 |
| 6,129,364 | A * | 10/2000 | Fisher | B60G 21/10 280/DIG. 1 |
| 6,240,348 | B1 * | 5/2001 | Shono | B60G 17/017 280/124.159 |
| 6,256,987 | B1 * | 7/2001 | Stolle | B60J 7/1273 60/484 |
| 6,267,387 | B1 * | 7/2001 | Weiss | B60G 3/26 280/5.52 |
| 6,282,470 | B1 * | 8/2001 | Shono | B60G 17/015 180/41 |
| 6,296,091 | B1 * | 10/2001 | Hamilton | B60G 17/018 251/52 |
| 6,669,208 | B1 * | 12/2003 | Monk | B60G 21/067 280/5.506 |
| 6,669,216 | B1 * | 12/2003 | Elser | B60G 17/0432 280/124.159 |
| 6,834,865 | B1 * | 12/2004 | Lin | B60G 21/067 280/5.507 |
| 7,384,054 | B2 * | 6/2008 | Heyring | B60G 21/10 280/124.159 |
| 7,429,050 | B2 * | 9/2008 | Amano | B60G 17/015 280/5.507 |
| 7,635,051 | B2 * | 12/2009 | Beck | F16F 9/3235 188/322.19 |
| 7,665,585 | B2 * | 2/2010 | Alexandridis | B60G 17/0152 248/562 |
| 7,686,309 | B2 * | 3/2010 | Munday | B60G 21/06 280/5.506 |
| 8,544,863 | B2 * | 10/2013 | Revill | B60G 21/06 280/124.16 |
| 8,641,051 | B2 * | 2/2014 | Pavuk | F16F 9/049 280/124.16 |
| 9,150,282 | B2 * | 10/2015 | Heyring | B63B 39/00 |
| 9,321,319 | B2 * | 4/2016 | Seminara | B60G 17/056 |
| 9,481,221 | B2 * | 11/2016 | Reybrouck | F16F 9/46 |
| 9,487,249 | B2 * | 11/2016 | Scott | B62D 33/0604 |
| 9,517,673 | B2 * | 12/2016 | Izak | B60G 17/00 |
| 9,643,466 | B1 * | 5/2017 | Christoff | B60G 17/005 |
| 9,702,349 | B2 * | 7/2017 | Anderson | B60G 17/052 |
| 9,783,018 | B2 * | 10/2017 | Ogino | B60G 17/0155 |
| 10,350,958 | B2 * | 7/2019 | Stolle | B60G 17/0272 |
| 10,369,859 | B2 | 8/2019 | Stolle et al. | |
| 11,273,682 | B2 * | 3/2022 | Kubota | B60G 17/0272 |
| 11,358,432 | B2 * | 6/2022 | Hirao | F16F 9/535 |
| 2009/0057969 | A1 | 3/2009 | Michel | |

FOREIGN PATENT DOCUMENTS

| | | |
|---|---|---|
| DE | 103 45 987 A1 | 4/2005 |
| DE | 10 2007 040 734 A1 | 3/2009 |
| DE | 199 55 410 B4 | 5/2011 |
| DE | 10 2014 018 788 B3 | 12/2015 |
| DE | 10 2015 119 637 A1 | 5/2017 |
| EP | 1 681 189 A2 | 7/2006 |
| JP | 2006213119 A | 8/2006 |
| JP | 2009-126455 A | 6/2009 |
| WO | 2009/124617 A1 | 10/2009 |
| WO | 2012/061127 A1 | 5/2012 |
| WO | 2016/180590 A2 | 11/2016 |
| WO | 2016/180591 A2 | 11/2016 |

* cited by examiner

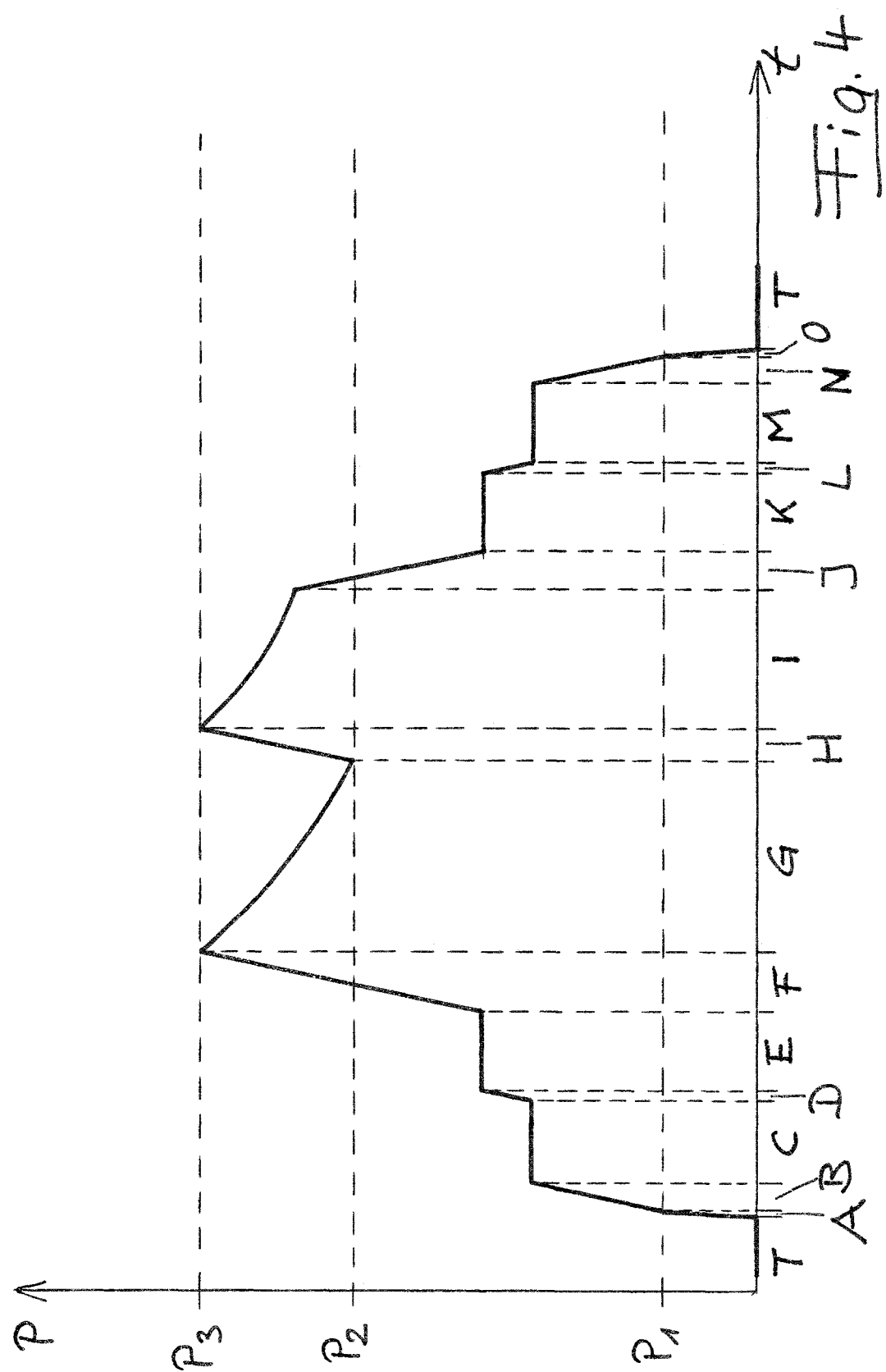

MOTOR VEHICLE CHASSIS

FIELD OF THE INVENTION

The present invention relates to a motor vehicle chassis. In particular, the invention relates to a motor vehicle chassis having a base structure and four wheels connected with it via respectively one wheel suspension, wherein each wheel suspension has a suspension spring and the base structure can be hydraulically adjusted in level between a raised and a lowered position, in that a hydraulic adjuster is assigned to one of the two foot points of each suspension spring, wherein furthermore at least two of the adjusters can be pressurized in parallel by a common hydraulic aggregate comprising a tank and a motor-pump unit and activated by a control unit.

BACKGROUND

Motor vehicles, especially such in the higher class, are increasingly being equipped with devices for level adjustment, which permit the vehicle in question to travel in different modes of operation, namely on the one hand in a mode with raised base structure and on the other hand in a mode with lowered base structure. As regards the adaptability of the vehicle to the specific usage situation, such adjustability is of advantage regardless of whether the mode of operation with raised base structure is now regarded as "normal operation," from which—to reduce air resistance and thus fuel consumption—the chassis will be lowered, or else whether conversely the mode of operation with lowered base structure is regarded as "normal operation," from which—to increase ground clearance while traveling over uneven terrain—the chassis will be raised.

Systems for corresponding adjustment of the level of motor vehicles may be designed differently. In particular, electrical, pneumatic and hydraulic systems are known in which respectively an electrical, pneumatic or hydraulically operating adjuster acting on one of the two foot points of the suspension spring in question is provided on the wheel suspensions (concerning electrical adjusters, see DE 103 45 987 A1, DE 199 55 410 B4, DE 10 2007 040 734 A1, EP 1 681 189 A2 and WO 2009/124617 A1, for example, and, concerning hydraulic adjusters, see DE 10 2014 018 788 B3, DE 32 23 195 A1, JP 2006-213119 A, JP 2009-126455 A, WO 2012/061127 A1, DE 197 44 757 A1 and DE 10 2015 119 637 A1, for example). In this context, hydraulic systems have particularly favorable properties due to the high power density. In particularly simply constructed systems for hydraulic level adjustment, these adjusters are designed as single-acting hydraulic cylinders, in which pressurization of the respective (single) hydraulic working chamber of the adjuster by the hydraulic aggregate brings about raising of the base structure, whereas lowering of the base structure takes place—accompanied by controlled return flow of hydraulic fluid from the working chamber of the adjuster back into the tank—by dead weight of the motor vehicle. The relatively small necessary dimensions of such hydraulic systems and components permit completely decentralized design of the hydraulic level-adjustment system by assigning to each wheel, its own hydraulic motor-pump unit, which supplies exclusively the hydraulic adjuster assigned to the wheel in question (see DE 10 2015 119 637 A1, WO 2016/180590 A2 and WO 2016/180591 A2, for example). However, especially to save costs and weight, systems corresponding to the generic prior art indicated in the introduction are also being increasingly requested, in which two hydraulic aggregates are provided, which respectively supply two adjusters—assigned to one axle—in parallel, or even only one single (centralized) hydraulic aggregate is provided, which pressurizes all four hydraulic adjusters in parallel.

SUMMARY

The present disclosure is directed toward providing a motor vehicle chassis of the generic type indicated in the introduction that is improved in terms of the function of the system for level adjustment.

This stated object is achieved in that the at least two hydraulic adjusters that can be pressurized by the common hydraulic aggregate communicate hydraulically with the accumulator chamber of a spring-piston accumulator, which has at least one piston-position transmitter linked by signal transmission to the control unit. Accordingly, in other words, the hydraulic working chambers of the at least two hydraulic adjusters pressurized by a common hydraulic aggregate in the hydraulic adjusting system of the motor vehicle chassis not only are connected hydraulically in parallel to one another but also to the accumulator chamber of an additionally provided spring-piston accumulator, which is provided with a piston-position transmitter, which detects the position of the piston and in turn communicates via signal transmission with the control unit. By means of the control unit, the motor-pump unit is switched on or off in dependence on at least one piston-position detection signal generated by the at least one piston-position transmitter. In this way, several noteworthy advantages absolutely important for practicality can be achieved at the same time. Thus, due to the integration of at least one spring-piston accumulator, the system is tolerant in several respects.

Thus, for example, the hydraulic aggregate does not have to be switched off immediately upon reaching the raised position of the base structure. To the contrary, in the course of raising the base structure during implementation, the spring-piston accumulator is typically filled further even after the (completely) raised position of the base structure has been reached, accompanied by further increase of the pressure prevailing in the accumulator space of the spring-piston accumulator and in the working chambers of the adjusters communicating with it. Thus a reservoir of hydraulic fluid preloaded under high pressure is kept in readiness, from which any leakage quantities (especially via a check valve holding the raised position of the chassis back to the tank) are replaced immediately and automatically, and so any leaks of the said check valve that develop due to wear or dirt do not lead to any impairment of the functionality of the motor vehicle. This makes it possible to use even relatively inexpensive hydraulic components having rather large fabrication tolerances without detrimental consequences.

A successive decrease of the quantity of hydraulic fluid remaining in the accumulator chamber of the spring-piston accumulator as a result of the corresponding leakage compensation leads to a gradual movement of the piston of the spring-piston accumulator. Since the pressure prevailing in the accumulator chamber of the spring-piston accumulator correlates directly with the piston position, it is possible to ensure, via switching on the motor-pump unit at a predetermined position of the piston detected by the piston-position transmitter, that the spring-piston accumulator is repressurized in timely manner. The position of the piston of the spring-piston accumulator that brings about switching-on of the motor-pump unit is chosen such that such a pressure always exists in the accumulator chamber of the spring-piston accumulator and the working chambers of the adjusters as to exceed that pressure value necessary at maximum permissible load of the motor vehicle to hold the base structure in the raised position (even during additional loads due to cornering and/or braking). In this way "diving" or "squatting" of the vehicle in dynamic loading situations and/or during increase of the load of the motor vehicle (e.g. due to boarding of further persons) is suppressed by displacement of hydraulic fluid out of the working chambers of the adjusters into the accumulator chamber of the assigned spring-piston accumulator. Thus the base structure always remains reliably at the raised level, i.e. even in cases of limit load, and so, from viewpoints of driving safety, critical intermediate conditions (between raised and lowered position) are reliably suppressed.

Repressurization of the spring-piston accumulator by the hydraulic aggregate is ended, i.e. the motor-pump unit is switched off again, when a predetermined maximum pressure has been reached in the working chambers of the adjusters and the accumulator chamber of the assigned spring-piston accumulator. A (second) operating position of the piston of the spring-piston accumulator, correlating with the maximum pressure and detected via the at least one piston-position transmitter, can be used for this purpose. In this respect, it has proved favorable when the spring-piston accumulator has at least two piston-position transmitters linked via signal transmission with the control unit.

Due to the indirect detection of the pressure in the working chambers of the adjusters via the position of the piston of the spring-piston accumulator communicating with it, a very high degree of reliability can be achieved. Thus the embodiments disclosed take advantage of the knowledge that determination of the position of the piston of the spring-piston accumulator (especially at two discrete positions) is less susceptible to error than "direct" software-based detection of the pressure in the working chambers of the adjusters via respectively a pressure sensor and evaluation electronics connected to its output. In this connection, it is quite particularly advantageous when, according to a preferred further development, the at least one piston-position transmitter is designed as a Hall sensor. This configuration is characterized by particularly high reliability accompanied by relatively low costs.

In the foregoing, it has already been expressed that the spring-piston accumulator preferably has at least two piston-position transmitters, linked by signal transmission with the control unit, which as regards the position of the piston of the spring-piston accumulator detect two discrete positions, wherein a first represents the switch-on pressure for repressurization of the spring-piston accumulator and a second the switch-off pressure. In a further optimized configuration, the spring-piston accumulator even has three piston-position transmitters, wherein the third piston-position transmitter detects the position of the piston when the spring-piston accumulator is empty. If the piston occupies this position, this signals a minimum pressure state of the spring-piston accumulator and thus indicates that the base structure of the chassis is completely lowered. In such systems provided with several piston-position transmitters, the positioning of at least two piston-position transmitters relative to one another and the dimensioning of the piston detected by them (or of elements connected to the piston; see below) may be advantageously matched to one another in such a way that two piston-position transmitters generate a detection signal in a defined position range of the piston. In this way, further operating or state information is provided.

Particularly preferably, the threshold pressure of the spring-piston transmitter, i.e. that minimum pressure in the accumulator chamber at which, when it is exceeded, the piston is moved against the force of the spring in the sense of enlargement of the accumulator chamber, is lower than the pressure necessary for raising the base structure by means of the adjusters connected in their working chambers to the spring-piston accumulator. In contrast, the maximum working pressure of the spring-piston accumulator, i.e. that maximum pressure in the accumulator chamber at which the movement capacity of the piston has been exhausted and the accumulator chamber has reached its maximum volume, is substantially higher than the pressure necessary for raising the base structure by means of the adjusters connected in their working chambers to the spring-piston accumulator. A pressure ratio that is favorable in practice between the maximum working pressure and the threshold pressure of the spring-piston accumulator is between 2:1 and 4:1, particularly preferably between 2.5:1 and 3.5:1.

Within the scope of the present disclosure, the at least one piston-position transmitter is preferably integrated into the housing of the spring-piston accumulator such that it directly detects the piston or a transmitter element permanently connected directly with the piston. In the same way, however, it is also conceivable that the spring-piston accumulator has a mechanical output, permanently connected with the piston (especially in the form of a piston rod protruding from the housing of the spring-piston accumulator), to which the at least one piston-position transmitter is assigned. The mechanical output itself or a separate component part permanently connected therewith function in this case as the transmitter element for the at least one piston-position transmitter.

In the spring-piston accumulator used in the scope of the embodiments, the diameter of the piston is preferably substantially smaller than the diameter of a spring mounted in a separate spring chamber and acting via a piston rod on the piston. In this way the functionality that is definitive here can be ensured with minimum overall dimensions. Particularly preferably, this spring acts in the direction of insertion of the piston rod into the housing of the spring-piston accumulator. Likewise from the viewpoint of particularly good functionality with simultaneously high efficiency, it is advantageous when the differential volume of the accumulator chamber that exists between the switch-on piston position for the motor-pump unit and the switch-off piston position for the motor-pump unit is less than 3% of the volume of the working chambers of the hydraulic adjuster communicating with the spring-piston accumulator, particularly preferably less than 2% thereof. In typical applications, the spring-piston accumulator fulfills its purpose with this dimensioning, without imposing too much of a space requirement for its installation.

According to yet another advantageous further development, all four adjusters can be pressurized in parallel by a common hydraulic aggregate comprising a tank and a motor-pump unit and activated by a control unit. In this configuration, the advantages and favorable properties of the invention explained in the foregoing are manifested particularly clearly.

BRIEF DESCRIPTION OF THE DRAWING

The present invention will be explained in more detail hereinafter on the basis of a preferred exemplary embodiment illustrated in the drawing, wherein:

FIG. 4 illustrates, on the basis of the pressure variation, the way in which the hydraulic system according to FIG. 2 functions when implemented in the motor vehicle.

DETAILED DESCRIPTION OF THE PREFERRED EMBODIMENTS

Figure 1:
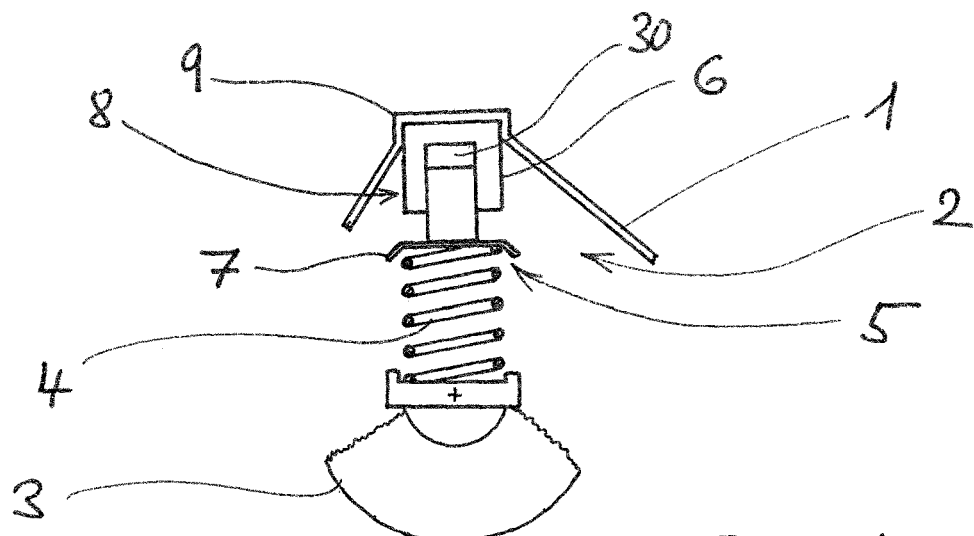
FIG. 1 shows, by way of example in the scope relevant for understanding the invention, a schematic view of one of the four wheel suspensions of an inventive motor vehicle chassis.

The motor vehicle chassis according to the illustrated exemplary embodiment comprises a base structure 1, with which four wheels 3 are connected via respectively one wheel suspension 2. Each wheel suspension 2 is provided in known manner with a suspension spring 4 clamped functionally between wheel 3 and base structure 1. A hydraulic adjuster 8 designed as a single-acting hydraulic cylinder 6 acting on upper spring plate 7 is assigned to upper foot point 5 of suspension spring 4, so that the distance between upper spring plate 7 and bearing point 9 of adjuster 8 on base structure 1 is variable. By appropriate pressurization of hydraulic adjuster 8, base structure 1 can be hydraulically adjusted in level between a raised and a lowered position. Since standard prior art is used for this purpose, further explanations are superfluous.

Figure 2:
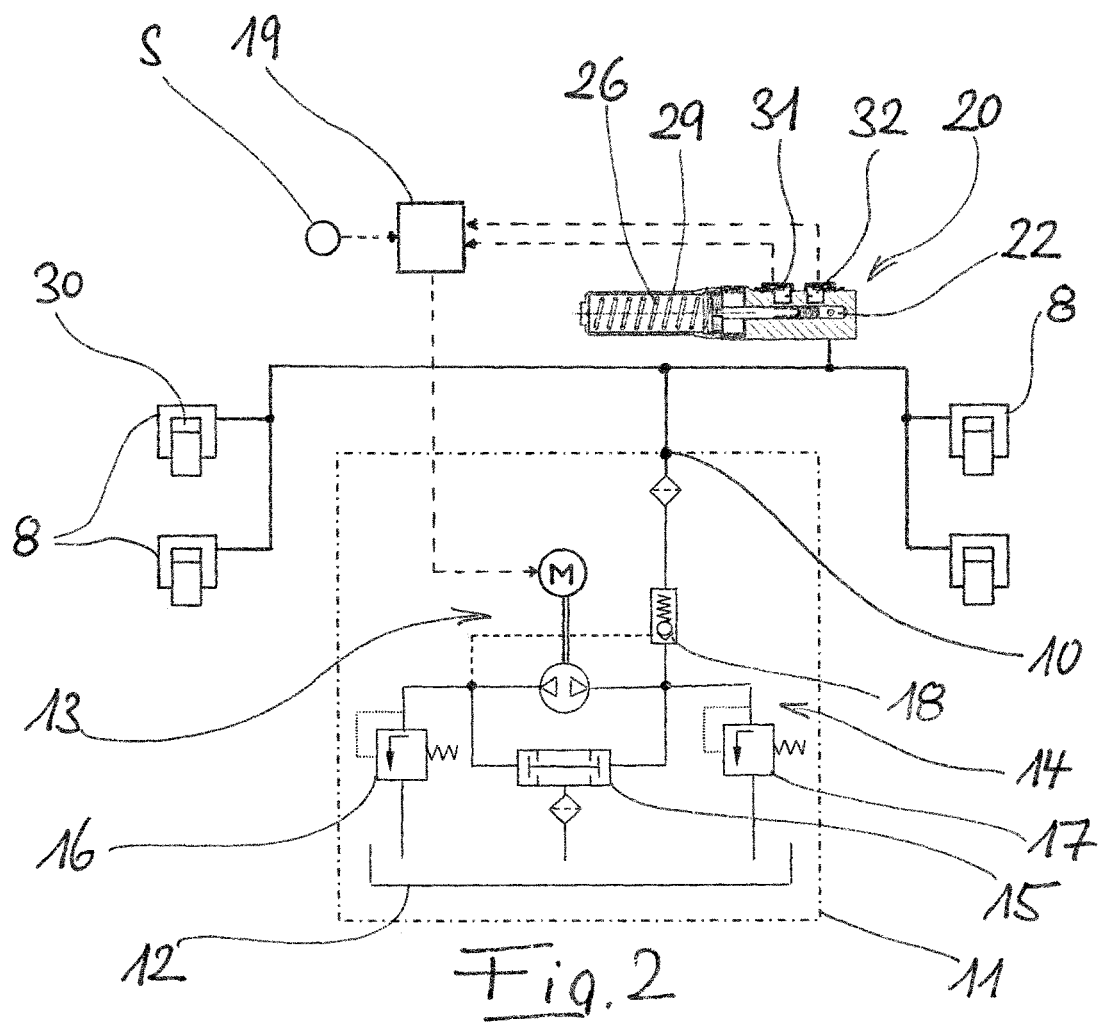
FIG. 2 shows the hydraulic system used for adjusting the level of the motor vehicle in question and FIG. 3 shows in detail the spring-piston accumulator of the hydraulic system illustrated in FIG. 2. Furthermore.

As illustrated in FIG. 2, all four adjusters 8 are hydraulically connected in parallel and, being hydraulically in communication with the output 10 of a common hydraulic aggregate 11, can be pressurized in parallel thereby. The latter comprises a tank 12, a motor-pump unit 13 (having reversible conveying direction) and a line and valve arrangement 14 having a changeover valve 15, two pressure-limiting valves 16, 17 and a hydraulically unlockable check valve 18. Such hydraulic aggregates, in which the operation of motor-pump unit 13 happens to be controlled by a control unit 19, are known as such in the field of adjustment of the level of motor vehicles (see DE 10 2014 018 788 B3), and so, by reference to the relevant prior art, further explanation can be dispensed with at this place—since obviously details of hydraulic aggregate 11 are not decisive under the present circumstances, because other known hydraulic aggregates may also be used in the same way.

Figure 3:
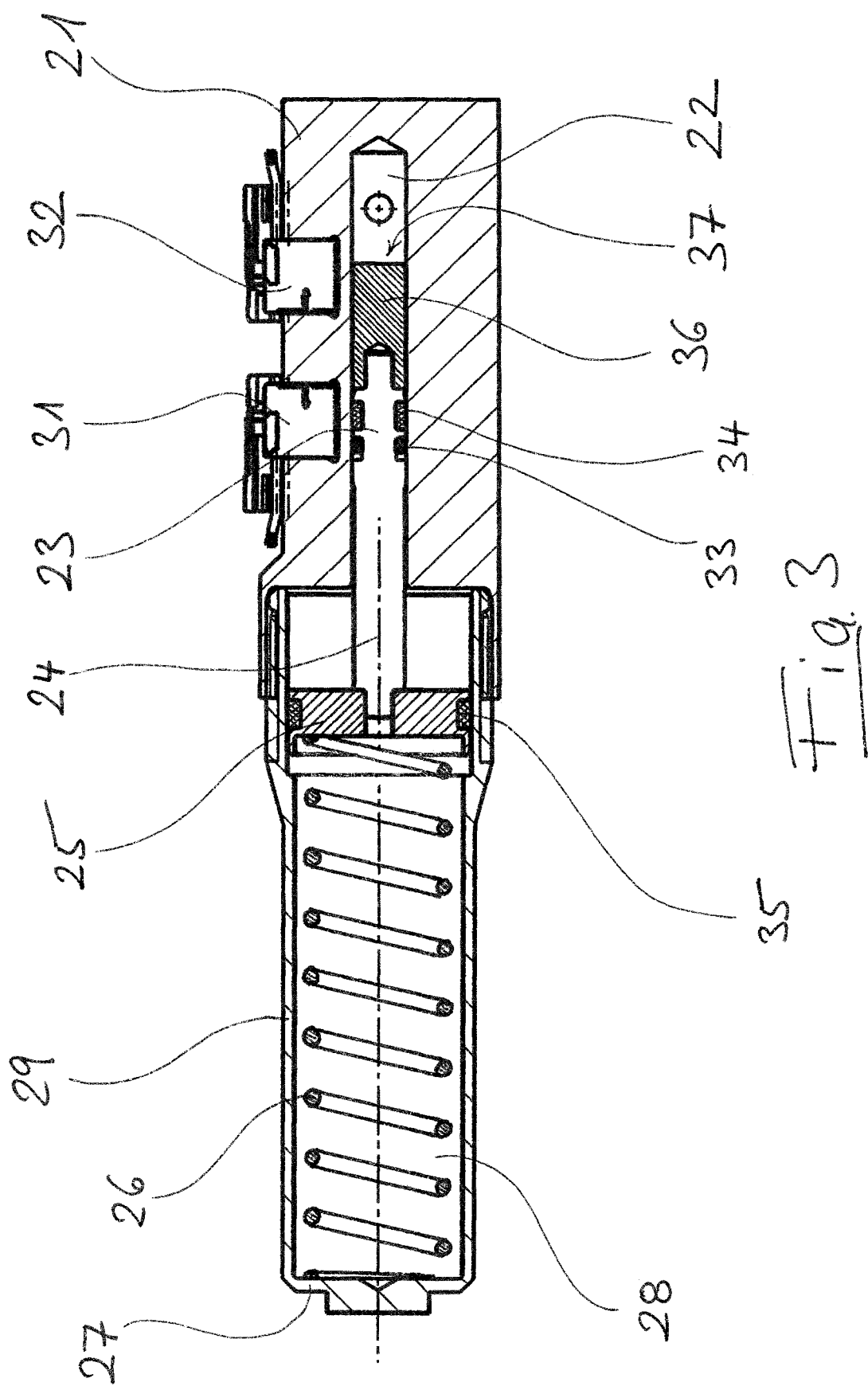

The hydraulic system further comprises a spring-piston accumulator 20 (see in particular FIG. 3). This has a housing 21, which defines a cylindrical hydraulic accumulator chamber 22, which is closed with variable volume by a displaceable piston 23. This piston 23 is sealed by means of O-rings 33, 34 relative to the cylindrical bore bounding accumulator chamber 22. Piston 23 forms a unit—made of aluminum—together with piston rod 24, which protrudes from housing 21 and at its end supports a spring plate 25. This is acted on by an accumulator spring 26, which with its other end is braced on the bottom 27 of a sleeve 29, defining a spring chamber 28 and connected to housing 21. Spring plate 25 is guided displaceably by means of a sliding/guide ring 35 in a cylindrical portion of sleeve 29. The pressure prevailing in accumulator chamber 22 depends on the position of piston 23; it increases—according to the spring characteristic of accumulator spring 26—with increasing volume of accumulator chamber 22. Spring-piston accumulator 20 is connected to the other hydraulic system explained in the foregoing in such a way that its accumulator chamber 22 is in communication with working chambers 30 of the four adjusters 8, i.e. is connected in parallel with them and can be pressurized together with them by common hydraulic aggregate 11.

Two piston-position transmitters 31, 32 designed as Hall sensors are disposed on housing 21 of spring-piston accumulator 20, and, provided a transmitter element 37—designed as transmitter head 36 mounted at the front end on piston 23—is present in the respective detection region, they generate a detection signal. The two piston-position transmitters 31, 32 are connected via signal transmission with control unit 19 to the effect that the respective detection signal is switched to control unit 19. Since spring plate 25 moves synchronously with piston 23, piston-position transmitters 31, 32 could also be disposed on sleeve 29, for example, instead of on housing 21, and could detect the position of spring plate 25 with comparable effect. In this alternative configuration, the structural unit comprising piston rod 24 and spring plate 25 would (also) represent a mechanical output, which is connected with piston 23 and to which the at least one piston-position transmitter is assigned.

In order temporarily to increase the ground clearance of a motor vehicle being operated in lowered mode during "normal operation", i.e. with unpressurized adjusters 8, which vehicle has a smaller axle load in front than in the rear in the present example but is equipped with identical hydraulic adjusters 8 on all four wheel suspensions 2, the following procedure is chosen (see FIG. 4):

According to a signal switched manually by the driver via input unit S to control unit 19, hydraulic aggregate 11 is switched to conveying mode. Hydraulic fluid is conveyed out of tank 12 to output 10 and further to the four adjusters 8 and spring-piston accumulator 20. After the initial rapid pressure buildup as far as threshold pressure p1 of spring-piston accumulator 20 (phase A), filling of the latter begins (phase B), accompanied by further rise of the system pressure. When the system pressure reaches that value at which the lifting force of the hydraulic adjusters 8 assigned to the two front wheels corresponds to the axle load of the front axle, continued conveyance of hydraulic fluid by hydraulic aggregate 11 brings about raising of the front end of base structure 1 (phase C). When the vehicle has been raised to the maximum in front, spring-piston accumulator 20 is filled further during continued conveyance of hydraulic fluid by hydraulic aggregate 11, and specifically until the system pressure reaches that value at which the lifting force of the hydraulic adjusters 8 assigned to the two rear wheels corresponds to the axle load of the rear axle (phase D). From then on, continued conveyance of hydraulic fluid by hydraulic aggregate 11 brings about raising of the rear end of base structure 1 (phase E). If the vehicle has also been raised to the maximum at the rear, spring-piston accumulator 20 is filled further (phase F)—accompanied by further increase of the system pressure—during continued conveyance of hydraulic fluid by hydraulic aggregate 11, and specifically until transmitter element 37 enters the range of detection of piston-position transmitter 31, whereby it is displayed that the system pressure has reached switch-off pressure p3, at which control unit 19 switches off motor-pump unit 13 of hydraulic aggregate 11. Depending on individual vehicle electronics, the motor vehicle is ready at the latest now for operation in raised mode, although typically this is already the case as soon as repressurization pressure p2 (see below) has been exceeded.

If hydraulic fluid returns to tank 12 due to a leak within hydraulic aggregate 11, this has no impact on the position of the four adjusters 8, since the leakage quantity—accompanied by gradual decrease of the system pressure—is completely replaced from spring-piston accumulator 20. The volume of accumulator chamber 22 of spring-piston accumulator 20 is reduced in a manner corresponding to the movement of piston 23; and the system pressure also gradually decreases accordingly (phase G).

If the system pressure reaches the predetermined repressurization pressure p2, at which transmitter element 37 enters the range of detection of piston-position transmitter 32, repressurization of spring-piston accumulator 20, accompanied by increase of the system pressure (phase H), begins due to corresponding activation of hydraulic aggregate 11 by control unit 19. Motor-pump unit 13 of hydraulic aggregate 11 is switched off by control unit 19 when transmitter element 37 re-enters the range of detection of piston-position transmitter 31, whereby it is displayed that the system pressure has again reached switch-off pressure p3. Phases G and H are repeated as necessary as long as the vehicle is being operated in raised mode.

To lower the vehicle, the return flow of hydraulic fluid out of the four adjusters 8 back into tank 12 is enabled, and specifically is accompanied by operation of motor-pump unit 13 with reversed conveying direction (details in this regard are described extensively in DE 10 2014 018 788 A1). (In FIG. 4, there is illustrated, as phase I, a phase in which the system pressure gradually decreases similar to what happens in phase G, however with phase I ending, by allowing the return flow of hydraulic fluid out of the four adjusters 8 back into tank 12, before the decreasing system pressure reaches the repressurization pressure (switch-on pressure) p2.) In the process, hydraulic fluid first flows back—accompanied by correspondingly decreasing the system pressure—from spring-piston accumulator 20 into tank 12 (phase J). If in this process the system pressure reaches that value at which the lifting force of the hydraulic adjusters 8 assigned to the two rear wheels corresponds to the axle load of the rear axle, the vehicle becomes lowered in the rear—accompanied by displacement of hydraulic fluid out of hydraulic adjusters 8 assigned to the rear wheels into tank 12—(phase K). When the vehicle has been lowered completely at the rear end, hydraulic fluid again flows out of spring-piston accumulator 20—accompanied by correspondingly decreasing system pressure—back into tank 12 (phase L), and specifically until the system pressure reaches that value at which the lifting force of hydraulic adjusters 8 assigned to the two front wheels corresponds to the axle load of the front axle. From then on—accompanied by displacement of hydraulic fluid out of the hydraulic adjusters 8 assigned to the front wheels into tank 12—the vehicle is also lowered at the front end (phase M). If the vehicle has also been lowered completely at the front end, the remaining hydraulic fluid still present in accumulator chamber 22 is emptied into tank 12, whereby the system pressure decreases to threshold value p1 of spring-piston accumulator 20 (phase N). At this point the system pressure collapses (phase O). Depending on individual vehicle electronics, the motor vehicle is ready at the latest now for operation in lowered mode, although typically this is already the case as soon as the pressure has dropped below threshold value p1.

It is immediately obvious to the person skilled in the art that—for reasons of illustration—FIG. 4 is extremely distorted with respect to the variation of the system pressure with time. In particular, phases G and I are many times longer in reality than illustrated. Aside from that, it is to be mentioned that, for example, alternative configurations of the system for level adjustment may also be considered, inasmuch as the two piston-position transmitters 31, 32 are able to generate, in an intermediate position range of piston 23, a detection signal that can be utilized in the control unit, and/or a third piston-position transmitter is provided that detects the position of piston 23 when spring-piston accumulator 20 has been completely emptied. Finally, it is to be pointed out that it is possible, if such seems expedient, to integrate flow dividers respectively between the two adjusters assigned to one axle, in order to ensure uniform, symmetric raising/lowering even in the case of very greatly different loads on the left and right sides of the vehicle.

What is claimed is:

1. A motor vehicle chassis comprising,
a base structure (1);
four wheels (3) connected to the base structure, with each wheel connected to the base structure via a corresponding one wheel suspension (2), wherein each wheel suspension (2) has a suspension spring (4) and the base structure (1) can be hydraulically adjusted in level between a raised and a lowered position; and
four hydraulic adjusters, with a hydraulic adjuster (8) of the four hydraulic adjusters assigned to one of two foot points of each suspension spring (4);
wherein at least two of the hydraulic adjusters (8) of the four hydraulic adjusters can be pressurized in parallel by a common hydraulic aggregate (11) comprising a tank (12) and a motor-pump unit (13) and activated by a control unit (19),
wherein at least two hydraulic adjusters (8) that can be pressurized by the common hydraulic aggregate (11) communicate hydraulically with an accumulator chamber (22) of a spring-piston accumulator (20), which has at least one piston-position transmitter (31, 32) linked by signal transmission to the control unit (19), and
wherein a spring of the spring-piston accumulator applies a permanent biasing force to the accumulator chamber.

2. The motor vehicle chassis of claim 1, wherein the at least one piston-position transmitter (31, 32) is designed as a Hall sensor.

3. The motor vehicle chassis of claim 1, wherein the spring-piston accumulator (20) has at least two piston-position transmitters (31, 32) linked via signal transmission with the control unit (19).

4. The motor vehicle chassis of claim 3, wherein the positioning of at least two piston-position transmitters (31, 32) relative to one another and the dimensioning of a piston (23) of the spring-piston accumulator, or of a transmitter element connected in fixed positional relationship with the piston, detected by said piston-position transmitters (31, 32) are matched to one another in such a way that the two piston-position transmitters (31, 32) generate a detection signal in a defined position range of the piston (23).

5. The motor vehicle chassis of claim 1, wherein a spring (26) of the spring-piston accumulator (20) is disposed outside a housing (21) surrounding the accumulator chamber (22).

6. The motor vehicle chassis of claim 1, wherein, by means of the control unit (19), the motor-pump unit (13) is switched on or off in dependence on at least one piston-position detection signal generated by the at least one piston-position transmitter (31, 32), wherein the differential volume of the accumulator chamber (22) that exists between the switch-on piston position and the switch-off piston position is less than 3% of the volume of the chambers (30) of the hydraulic adjusters (8) communicating with the spring-piston accumulator (20).

7. The motor vehicle chassis of claim 1, wherein the spring-piston accumulator (20) has a mechanical output connected with the piston (23) and to which the at least one piston-position transmitter (31, 32) is assigned.

8. The motor vehicle chassis of claim 1, wherein all four adjusters (8) can be pressurized in parallel by the common hydraulic aggregate (11), wherein the common hydraulic aggregate comprises a tank (12) and a motor-pump unit (13) and is activated by the control unit (19).

9. The motor vehicle chassis of claim 1, wherein a threshold pressure (p1) of the spring-piston accumulator (20) is lower than the pressure necessary in the working chambers (30) of the adjusters (8) connected to it, for raising the base structure (1) by means of the adjusters (8).

\* \* \* \* \*

UNITED STATES PATENT AND TRADEMARK OFFICE
CERTIFICATE OF CORRECTION

PATENT NO. : 11,738,620 B2
APPLICATION NO. : 17/575280
DATED : August 29, 2023
INVENTOR(S) : Stolle et al.

It is certified that error appears in the above-identified patent and that said Letters Patent is hereby corrected as shown below:

On the Title Page

Item (73) Assignee: Assignee's name "HOERBIGER AUTOMOTIVE KOMFORSYSTEME GMBH" should be corrected to be --HOERBIGER AUTOMOTIVE KOMFORTSYSTEME GMBH--

Signed and Sealed this
Twenty-sixth Day of March, 2024

Katherine Kelly Vidal
*Director of the United States Patent and Trademark Office*